(No Model.)
W. & C. ANDREW.
TUBULAR METALLIC POST.
No. 519,311. Patented May 8, 1894.
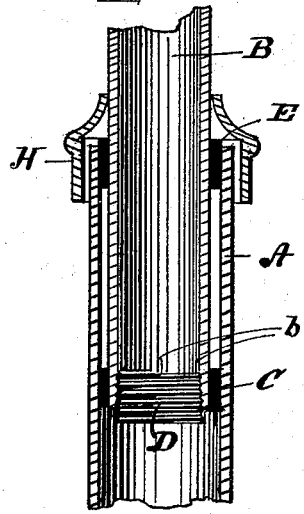
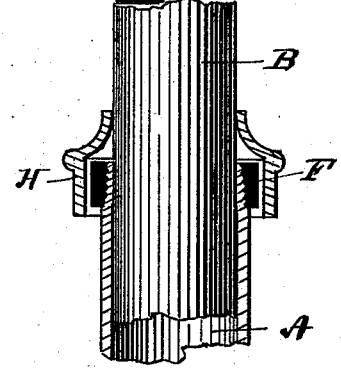
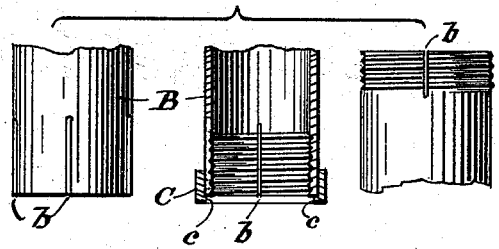
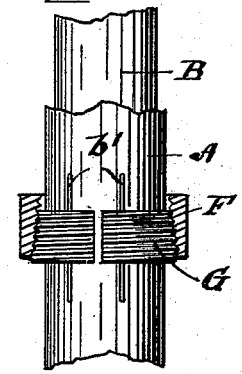
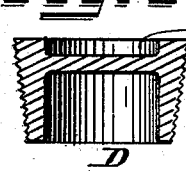
Witnesses:
Landon Freybler
D. W. Thrasher
Inventors:
William Andrew
Charles Andrew
by L. M. Hosea
atty

United States Patent Office.

WILLIAM ANDREW AND CHARLES ANDREW, OF CINCINNATI, OHIO.

TUBULAR METALLIC POST.

SPECIFICATION forming part of Letters Patent No. 519,311, dated May 8, 1894.

Application filed June 26, 1893. Serial No. 478,866. (No model.)

*To all whom it may concern:*

Be it known that we, WILLIAM ANDREW and CHARLES ANDREW, citizens of the United States, residing at Cincinnati, Ohio, have invented new and useful Improvements in Tubular Metallic Posts, of which the following is a specification.

Our invention relates to sectional tubular metallic posts employed for various purposes, such, for example, as supporting electric conducting wires for electric street railways, electric light circuits, lines of piping, &c., in cities and elsewhere; its object being to produce a simple, cheap, and efficient post of this type, which can be transported in sections and put together and set up with ordinary portable appliances where used.

To this end, it consists in a joint for posts consisting of tubes telescoped one within the other, the joint being formed by compression or expansion, as the case may be, of one tube against the other, by means of a conical screw acting upon a threaded portion of the pipe longitudinally, split at intervals to permit the desired expansion or contraction. Where the inner pipe is to be expanded against the outer pipe, the former is internally threaded at its pipe, the former is internally threaded at its pipe slit inward from the end by a series of longitudinal slits to permit its ready expansion. Where the outer pipe is to be compressed upon the inner one, these conditions are reversed, namely: the outer pipe, provided with the slits, is externally threaded to admit a conical screw-ring upon the outside, by which it is compressed upon the inner pipe.

In some cases, where it is desirable to make the joint at an intermediate point, where the end of the pipe cannot be conveniently reached, the outer pipe may be compressed upon the inner by longitudinally slitting the outer pipe at a given zone and surrounding the pipe at such zone with a split ring externally threaded and screwing thereon a solid ring internally conical and threaded.

Mechanism embodying our invention is illustrated in the accompanying drawings, in which—

Figure 1, is a vertical axial section of the post showing a jointure of two pipes differing considerably in diameter, with a lower expansion joint. Fig. 2, is a similar section showing a jointure with an upper contraction joint. Fig. 3, is a detail showing, at the left hand, an exterior view of a split pipe internally threaded; centrally, an axial cross section of the same, and at the right hand, the end of the split pipe externally threaded. Fig. 4, is a cross section of the expanding plug of Fig. 1, and Fig. 5, is an external view of a joint made by contracting the outer pipe at a point intermediate between the ends, by means of the outer conical screw ring and an interposed split screw ring.

Referring now to the drawings: A, and, B, designate, respectively, the larger and smaller tubes,—the latter being telescoped into the former a sufficient distance to produce the requisite lateral strength. In the form of joint shown in Fig. 1, the lower end of the inner tube, B, is threaded interiorly for a short distance upward, and is cut through by longitudinal slits, *b*, as indicated more clearly in the detail Fig. 3. Where the tubes differ materially in diameter, a ring, C, or bushing, slit at one side parallel to its axis to allow expansion, is provided for the lower end of the inner tube. The bushing may also be provided with a slight ledge, *c*, projecting inwardly at its lower edge, as a seat to the pipe.

The tubes, A, B, and bushing, C, being placed in the relation shown in Fig. 1, an expanding plug, D, slightly conical and exteriorly threaded to engage the threads of the tube, B, (and further provided with a squared aperture or with a depression, *d*, for the insertion of a rotating tool in the nature of an enlarged screw driver) is inserted in the lower end of the tube, B, and screwed home, thereby expanding the inner tube and bushing against the outer tube, A. The expansion is facilitated by the slitting of the tube at, *b*.

The upper ring, E, indicated in Fig. 1, is simply a plain split ring driven in as a bushing. In placing the parts together in the first instance, the ring, C, is first placed upon the lower end of the tube, B, as far as permitted by the ledge, *c*, the plug, D, inserted far enough to engage, and the tube, B, is then inserted in the upper end of the tube, A, and telescoped inward to its position carrying the ring, C, with it by means of the ledge. The ring, E, which may have a slightly wedge shaped cross section, is then slipped over the upper end of the tube, B, and driven to its position, as shown in Fig. 1, to form an annular bushing interposed between the two tubes. The plug, D, is then rotated and thus screwed into the slit end of the inner tube, expanding the same as described, and as permitted by the slits, b.

When the lower fastening is completed, the upper annular wedge, E, is driven finally home; and, if desired, the usual cap-piece, H, may be used to protect all parts from the weather. The upper joint may, however, be formed in a substantially similar manner as the lower, applied in reverse, that is to say: the upper end of the outer tube may be threaded exteriorly and slit, as shown in the detail at the right of Fig. 3; and a ring, F, with threaded conical interior opening is then engaged upon it from above. In Fig. 3 the tubes are shown of a relative size to require no bushing. The same general method of effecting the union of the tubes may be applied with a slight modification, as shown in Fig. 5, when the tubes can be reached only from the outside at a point remote from the ends. In this case, the outer tube is slit as indicated at, b', across the desired zone of compression; and a slit bushing, G, externally threaded and slightly conical, is placed upon it at said zone. The conical screw ring, F, is then slipped over the pipes and screwed down upon the bushing, G, which is meantime held from rotating; and the tube, A, thereby compressed upon the inner pipe, B.

By the method of jointing thus described, there is formed a cheap and perfectly secure jointing of the tubes, such as adapts them to be put together when delivered upon the ground, and enables them therefore to be readily handled in sectional parts for transportation. The joint is also easily taken apart by a reversal of the process of putting together, and by the same or similar appliances.

The machine work required, is confined to the cutting of the screw threads and slitting of the tubes; both of which operations are very readily and inexpensively performed by the ordinary appliances of the machine shop.

We claim as our invention and desire to secure by Letters Patent of the United States—

1. A metallic post embodying sections of tubing telescoped one within the other, one of said tubes being screw-threaded and longitudinally slitted at its end, and forced and held against the other tube by a correspondingly screw threaded conical plug or ring engaging the threads at the end of the slitted tube, substantially as set forth.

2. A tubular metallic post embodying in combination, an outer tube: an inner tube, interiorly threaded and longitudinally slit at its lower end; and a conical screw-threaded plug, screwed into the lower end of the inner section, thereby expanding the same against the outer tube, substantially as set forth.

In testimony whereof we have hereunto set our hands in the presence of two subscribing witnesses.

WILLIAM ANDREW.
CHARLES ANDREW.

Witnesses:
L. M. HOSEA,
LANDON FREYBLER.